United States Patent [19]
Lin

[11] Patent Number: 5,586,472
[45] Date of Patent: Dec. 24, 1996

[54] DETACHABLE BICYCLE PEDAL MOUNTING STRUCTURE

[76] Inventor: Wen-Hwa Lin, No. 5, Ming Shen Rd., Ta Chia Chen, Taichung Hsien, Taiwan

[21] Appl. No.: 522,078

[22] Filed: Aug. 31, 1995

[51] Int. Cl.⁶ .................................................. B62M 3/08
[52] U.S. Cl. .................. 74/594.1; 74/594.4; 403/325
[58] Field of Search .................. 74/512, 560, 562, 74/563, 594.1, 594.4; 280/259; 403/299, 300, 301, 306, 324, 325

[56] References Cited

U.S. PATENT DOCUMENTS

| | | | |
|---|---|---|---|
| 558,463 | 4/1896 | Bascom | 74/594.1 |
| 558,464 | 4/1896 | Bascom | 74/594.1 |
| 1,509,294 | 9/1924 | Head | 74/562 |
| 1,563,442 | 12/1925 | Scheben | 403/325 |
| 2,258,932 | 10/1941 | Jacobs | 403/325 |
| 2,714,026 | 7/1955 | Schultz | 403/301 |
| 3,888,136 | 6/1975 | Lapeyre | 280/259 |
| 4,627,761 | 12/1986 | Olson et al. | 403/324 |
| 5,326,186 | 7/1994 | Nyberg | 403/325 |
| 5,363,721 | 11/1994 | Hsiao | 74/594.1 |

FOREIGN PATENT DOCUMENTS 799522  6/1936  France ................................. 74/594.1

*Primary Examiner*—Charles A. Marmor
*Assistant Examiner*—Mary Ann Battista
*Attorney, Agent, or Firm*—Varndell Legal Group

[57] ABSTRACT

A detachable bicycle pedal mounting structure including connector connected to a crank, a pedal having a spindle inserted into a hexagonal axial coupling hole on the connector, and a spring-supported locating hole mounted in a radial stepped hole on the connector and forced by a spring into a locating hole on the spindle of the pedal to lock the spindle of the pedal in place, the locating bolt having a finger rod disposed outside the radial stepped hole for pulling by hand to disconnect the locating bolt from the locating hole of the spindle for permitting the pedal to be quickly removed from the connector.

1 Claim, 3 Drawing Sheets

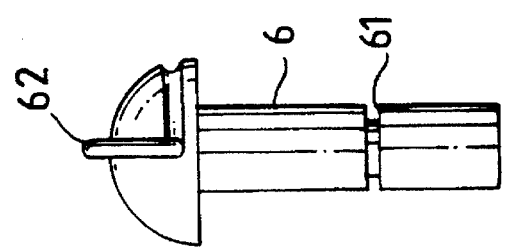
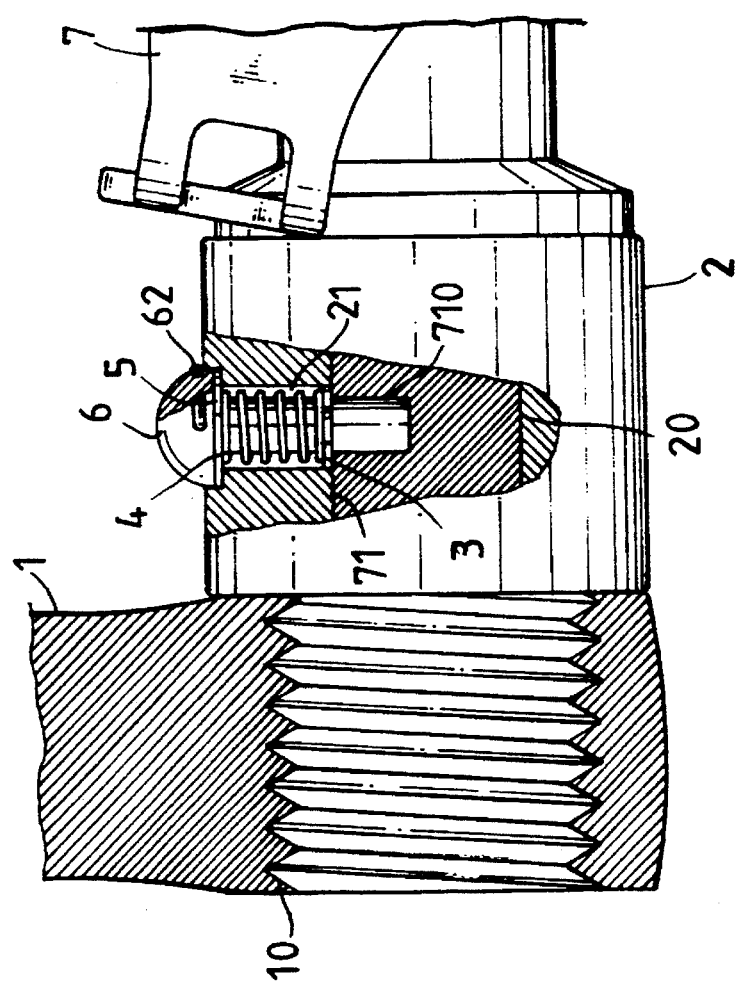

DETACHABLE BICYCLE PEDAL MOUNTING STRUCTURE

BACKGROUND AND SUMMARY OF THE INVENTION

The present invention relates to a detachable bicycle pedal mounting structure which permits the pedal to be quickly detached from the crank.

Regular bicycle pedals are commonly fastened to the cranks by screw bolts and nuts. This bicycle pedal mounting method does not permit the user to quickly detach the pedal from the crank for a replacement.

The present invention has been accomplished to provide a detachable bicycle pedal mounting structure which permits the user to quickly detach the pedal from the crank for a replacement. According to the preferred embodiment of the present invention, the detachable bicycle pedal mounting structure comprises a connector connected to a crank, a pedal having a spindle inserted into a hexagonal axial coupling hole on the connector, and a spring-supported locating hole mounted in a radial stepped hole on the connector and forced by a spring into a locating hole on the spindle of the pedal to lock the spindle of the pedal in place, the locating bolt having a finger rod disposed outside the radial stepped hole for pulling by hand to disconnect the locating bolt from the locating hole of the spindle for permitting the pedal to be quickly removed from the connector.

BRIEF DESCRIPTION OF THE DRAWINGS

FIG. 2 shows the connector connected between the crank and the spindle of the pedal, and the locating bolt forced into the locating hole of the spindle according to the present invention.

FIG. 3 is an elevational view of the locating bolt according to the present invention.

DETAILED DESCRIPTION OF THE PREFERRED EMBODIMENT

Figure 1:
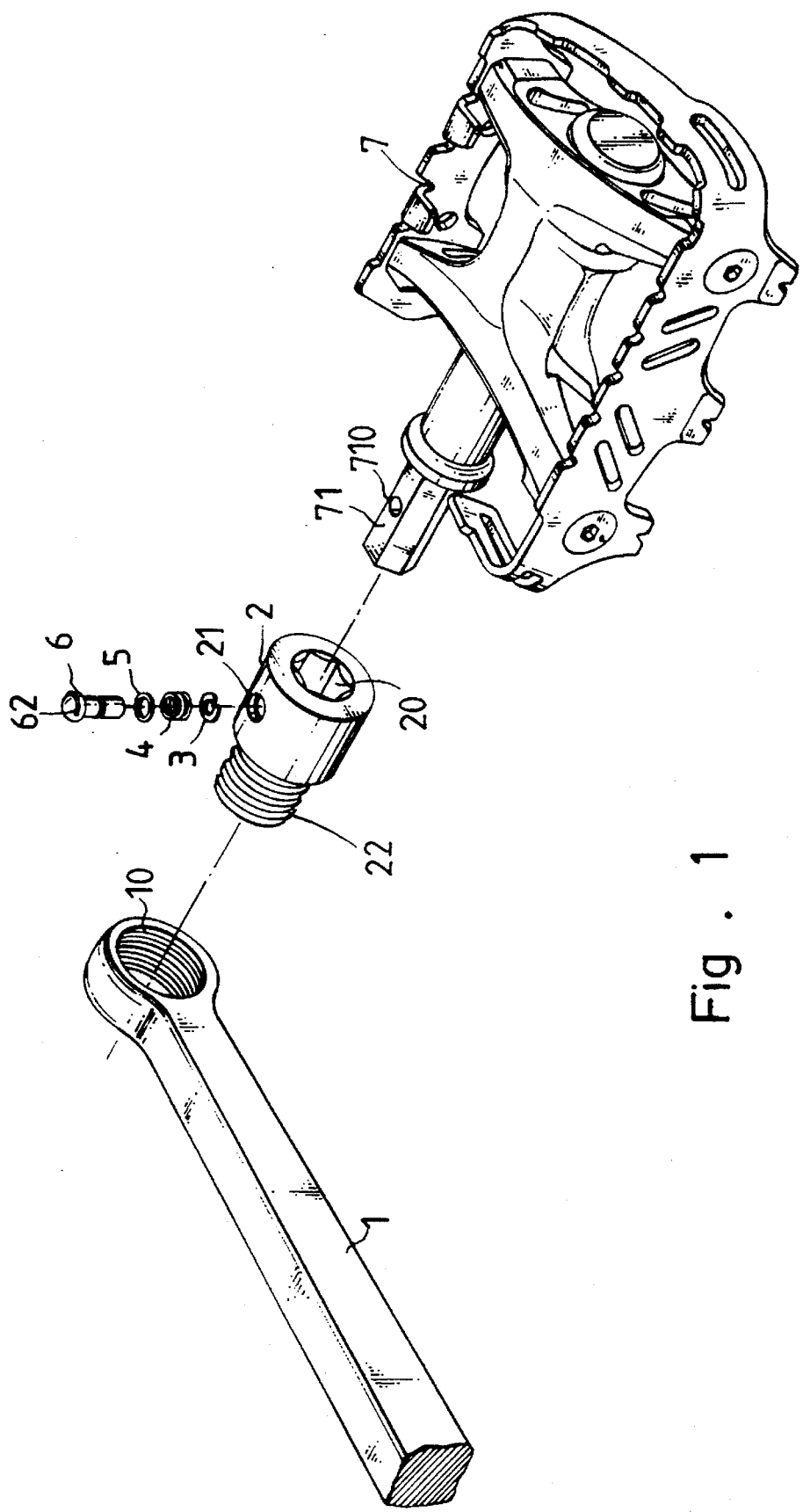
FIG. 1 is an exploded view of a detachable bicycle pedal mounting structure according to the present invention.
Figure 4:
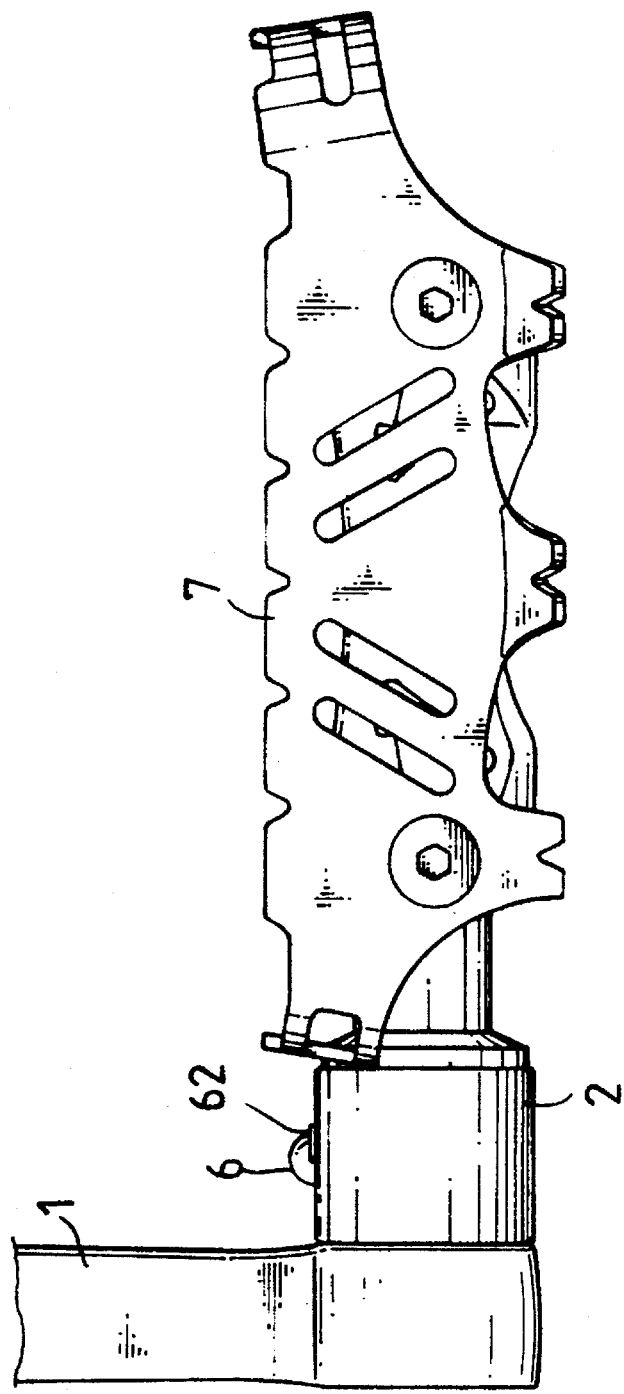
FIG. 4 is a front assembly view of the detachable bicycle pedal mounting structure according to the present invention.

Referring to FIGS. from 1 to 4, a detachable bicycle pedal mounting structure in accordance with the present invention is generally comprised of a crank 1, a pedal 7, and a connector 2 connected between the pedal 7 and the crank 1. The crank 1 has a screw hole 10 at one end for coupling the connector 2. The connector 2 comprises a screw rod 22 at one end threaded into the screw hole 10 of the crank 1, an axial hexagonal coupling hole 20 at an opposite, and a radial stepped hole 21 perpendicularly connected to the hexagonal coupling hole 20. The pedal 7 has a hexagonal spindle 71 inserted into the hexagonal coupling hole 20 of the connector 2. A locating bolt 6 is inserted through the stepped hole 21 into a locating hole 710 on the hexagonal spindle 71 of the pedal 7 to hold the pedal 7 and the connector 2 together, having an annular groove 61 around the shank thereof and a finger rod 62 raised from the head thereof. A clamp 3 is fastened to the annular groove 61 of the locating bolt 6 to hold a spring 4 inside the stepped hole 21. A packing ring 5 is mounted around the locating bolt 6 and fastened to the stepped hole 21 to hold the opposite end of the spring 4. The spring 4 is mounted around the locating bolt 6 and stopped between the clamp 3 and the packing ring 5. Through the finger rod 62, the locating bolt 6 can be pulled upwards from the locating bole 710 of the hexagonal spindle 71 of the pedal 7, for permitting the pedal 7 to the disconnected from the connector 2.

I claim:

1. A detachable bicycle pedal mounting structure comprising a crank having a screw hole at one end, a pedal having a spindle of hexagonal cross section, and a connector having a cylindrical shape with an axis, first and second ends arranged along said axis, a stepped hole radially extending from said axis, and a lock means mounted in said stepped hole for locking said spindle within said connector and preventing rotation of said spindle relative to said connector and said crank, said first end of said connector is a screw rod threaded into said screw hole of said crank and said second end of said connector is a hexagonal coupling hole receiving said spindle of said pedal; said stepped hole has a cylindrical upper hole, a cylindrical lower hole below said upper hole, and a step between said upper hole and said lower hole; a diameter of said lower hole is smaller than a diameter of said upper hole, said lock means including a locating bolt mounted in said stepped hole of said connector and tightly received in a locating hole of said spindle when locking said spindle in place; a head with a top and a side, a shank having an annular groove and extending from said head, a clamp secured in said annular groove of said locating bolt, a packing ring mounted around said shank of said locating bolt underneath said head, a spring mounted around the shank of said locating bolt and arranged between said packing ring and said clamp for providing a downward bias to said clamp and forcing said shank of said locating bolt into the locating hole of said spindle of said pedal, and a finger rod rotatably mounted in said head; said finger rod arranged at said side of said head when said spindle is locked in place and rotating to above said top of said head for pulling said locating bolt out of said stepped hole of said connector by hand.

* * * * *